United States Patent [19]
Ballini

[11] 3,941,497  
[45] Mar. 2, 1976

[54] TOOL HOLDER WITH CONTROLLED TOOL MOVEMENT

[75] Inventor: Andre Ballini, Billancourt, France

[73] Assignee: Regie Nationale des Usines Renault, France

[22] Filed: Nov. 30, 1973

[21] Appl. No.: 420,597

[30] Foreign Application Priority Data
Dec. 27, 1972  France .............................. 72.46387

[52] U.S. Cl. ................. 408/155; 408/180; 408/181
[51] Int. Cl.[2] ..................... B23B 29/00; B23G 3/00
[58] Field of Search .......... 408/154, 155, 156, 180, 408/181, 187, 153, 147, 186

[56] References Cited
UNITED STATES PATENTS
| 3,102,441 | 9/1963 | Milewski .......................... 408/153 X |
| 3,686,964 | 8/1972 | Thibaut et al. .................. 408/186 X |

FOREIGN PATENTS OR APPLICATIONS
| 36,395 | 12/1922 | Norway .............................. 408/153 |

*Primary Examiner*—J. M. Meister
*Attorney, Agent, or Firm*—Stevens, Davis, Miller & Mosher

[57] ABSTRACT

Tool holder with controlled tool movement, comprising two members adapted to be moved angularly away from each other against a resilient force, one member carrying the tool and being movable away from the other, a push member adapted to control this movement extending through one of said members, at least one lever being interposed between said push member in order to scale the control action between said push member and said tool holder, said lever being housed longitudinally within the central passage of a tubular bore machining bar. The machining bar in conjunction with a corresponding tool-bit constitute the aforesaid members that are movable away from each other.

8 Claims, 4 Drawing Figures

TOOL HOLDER WITH CONTROLLED TOOL MOVEMENT

This invention relates in general to tool-holders of the type wherein the wear take-up movement of the tool is controlled by acting upon the tool proper.

More particularly, this invention is concerned with a specific application, as a wear take-up device for a bore-machining tool bar, of the device disclosed in the U.S. Pat. No. 3,686,964 issued Aug. 29, 1972.

Basically, the tool holder having automatically controlled rod adjustment described and illustrated in the aforesaid U.S. Patent, comprises two members that are away from each other due to resilient force, one member for supporting the tool. This arrangement has a push member for controlling this movement that extends across one of said members, and has at least one lever interposed between the push member and a pair of closely spaced bearings for said members, to scale the adjustment of the tool holder by introducing a lever combination into the control mechanism.

According to the present invention, the fixed portion of the tool holder consists of a bore machining bar and the member to be moved away from the other consists of a tool-bit, a reduction lever being housed longitudinally within the bore machining bar. Moreover, the push member may consist of a screw held against axial movement and adapted, when rotated, to cause said reduction lever to pivot by means of a captive nut coupled to said lever.

This arrangement is characterized by two essential features:

a. the possibility of disposing end to end a plurality of devices of this type within a bore machining bar in order to use a maximum number of tools for a given bar length, and b. the possibility of controlling automatically the wear take-up simultaneously for all the tool devices incorporated in the bore machining bar with the assistance of electrically driven spindles provided on members pivoting about a bar parallel to the bore machining bar. The spindles are provided with adequate end pieces registering with adjustment screws in the bore machining bar. This bore machining bar is provided with positioning means such that the adjustment can be accomplished either by means of a pulse-energized step-by-step motor or as a function of time by using timing means controlling the rotation of a conventional electric motor.

Other features of this invention will appear from the following description with reference to the attached drawing illustrating an embodiment of the invention. In the drawing.

Figure 1:
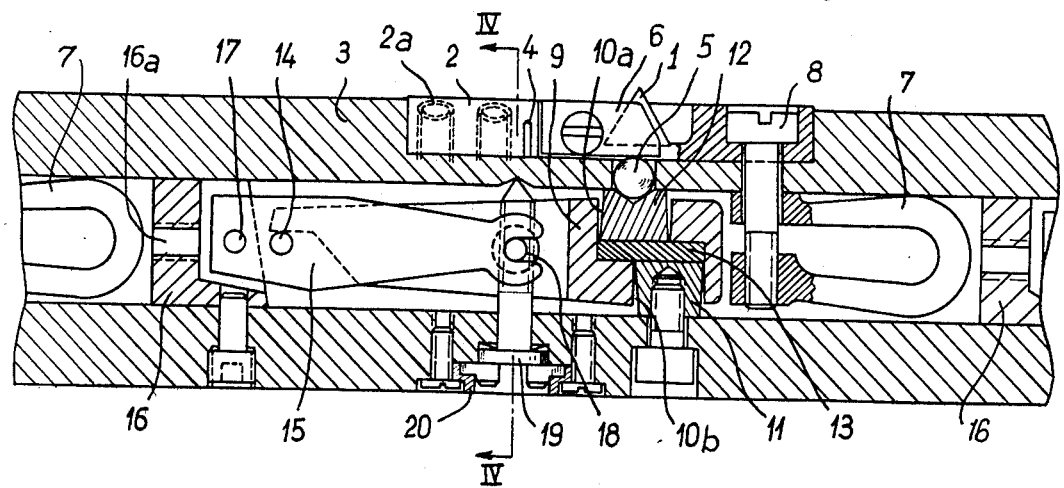
FIG. 1 is an axial section showing one portion of the bore machining bar illustrating one of several tool bits and associated adjusting devices.

Referring first to FIG. 1 of the drawing, the tool insert 1 is mounted in a tool bit 2 having one end secured by means of screws such as 2a in an externally facing cavity formed in the bore machining bar 3 and comprising an intermediate slot 4 permitting the flexion of said bit 2 under the control of a ball 5. A strap 6 screwed to the bit 2 locks the tool insert 1 to said bit 2. The latter is constantly urged against the bore machining bar 3, at its other end, by a hairpin spring 7 held in its stressed condition within the bore machining bar by means of a fastening screw 8 so disposed that turning this screw 8 in one or the other direction permits of adjusting the compression stress exerted by said hairpin spring 7.

Mounted inside the bore machining bar 3 is a forked lever 9 having a pair of opposite, partially overlapping off-set blind holes 10a and 10b formed therein at one end (FIG. 1). A bearing pin 11 secured by a screw to the bar 3 engages hole (10b) and a thrust pin 12 adapted to engage the ball 5 with a tapered cavity formed in the outer face of pin 12 engages hole 10a. Pin 11, 12 have their inner ends shaped and dimensioned to match the bottom of the corresponding holes 10b, 10a; preferably, these pins 11, 12 have a gradually decreasing cross-sectional area (a tapered shape is shown by way of example in this embodiment) to accomodate the angular movements to be accomplished by the lever 9 with respect to the pins. Furthermore, a relatively thin plate 13 of resilient deformable material is inserted between these pins 11 and 12, as shown.

The ends of the forked arms of lever 9 engage a cylindrical stop 14 rigid with an intermediate lever 15 adapted to pivot at 17 within a strap 16 secured by means of set screws to the bore machining bar 3. The strap 16 also comprises a tapped hole 16a concentrical with the bore machining bar 3 so that, by using a screw-rod not shown in the drawing, this part of the mechanism can be introduced into the bore of the machining bar, or removed therefrom.

The lever 15 has its opposite end trunnioned to the strap 16 by engaging shouldered portions of a captive nut 18. A screw 19 having a pointed tip, held against axial movement by means of a cover 20 (fastened by screws, as shown) in a tapered cavity formed in the bore machining bar 3, is adapted when rotated to impart a movement of translation to said captive nut 18 so that the lever 15 is caused to pivot about its pin 17.

Figures 2, 3:
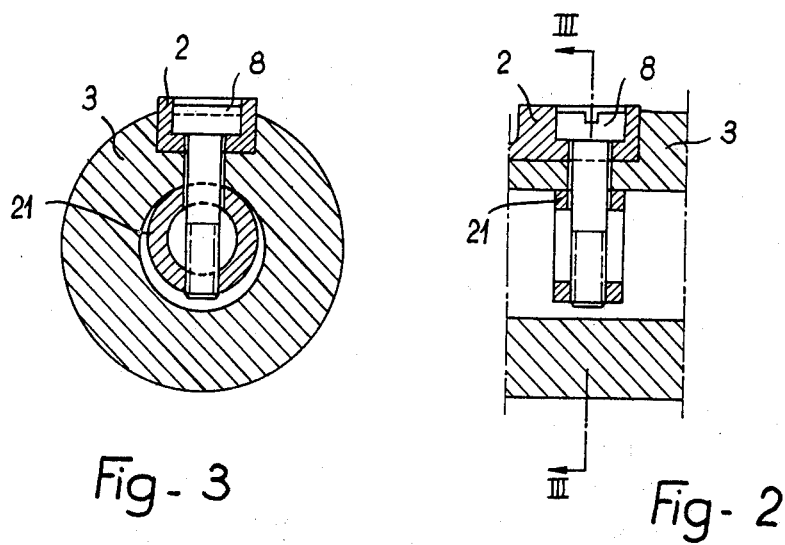
FIG. 2 is a fragmentary axial section showing a modified embodiment of the resilient return means urging the tool insert carrier member against the bore machining bar.
FIG. 3 is a cross-sectional view of the same detail, the section being taken along the line III—III of FIG. 2.

FIGS. 2 and 3 illustrate a modified and preferred embodiment of the resilient return means for urging the tool bit 2 against the bore machining bar 3. In this preferred embodiment, the general cross-sectional dimensions of the wear take-up device within the bar 3 are reduced by substituting for the hairpin spring 7 a compression-stressed annular spring 21. As in the preceding embodiment the compression of this annular spring 21 can be adjusted by means of the screw 8.

Figure 4:
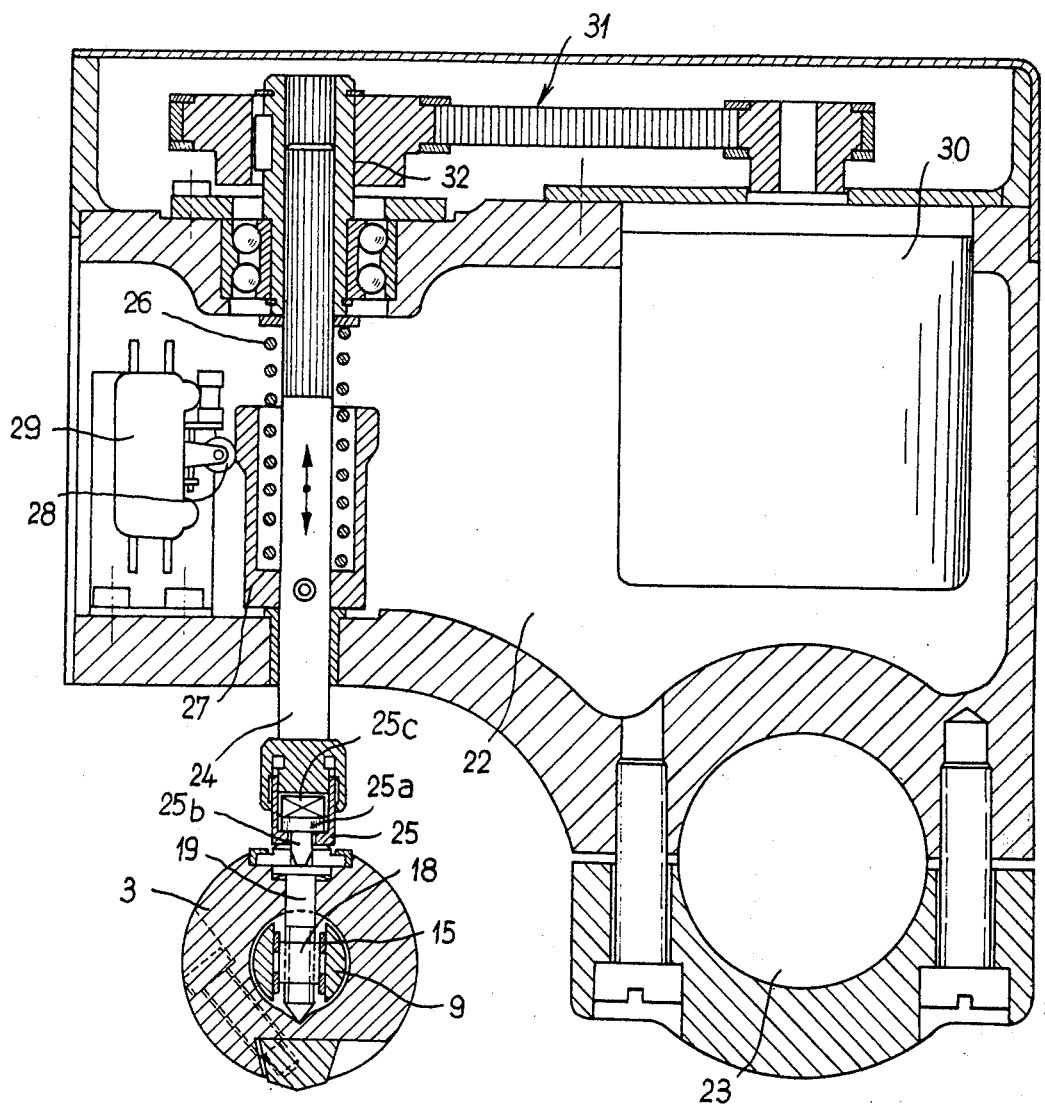
FIG. 4 illustrates in vertical section automatic wear take up control means, the bore machining bar being shown in a cross-section taken along the line IV—IV of FIG. 1, at the level of the adjustment screw.

FIG. 4 illustrates in vertical section a mechanism for automatically controlling the wear take-up means and, in cross-section, the corresponding portion of the bore machining bar 3. This bar 3 is so located that when it is stopped the adjustment screw 19 is disposed vertically with the head up. The adjustment mechanism 22 is retracted during the tool operation and when the bore machining bar 3 is stopped this mechanism pivots about a bar 23 parallel to the bore machining bar 3.

This adjustment mechanism 22 comprises a spindle 24 supporting a chuck 25 receiving a screwdriver tip 25a provided with a lower or depending tenon 25b engageable into the slot of the adjustment screw 19, and an upper tenon 25c extending in a plane perpendicular to that of said depending tenon 25b; this upper tenon 25c normally engages a slot formed in chuck 25 so as to be rotatably solid therewith. This coupling between the tool bit and the chuck comprises a slight play and the depending or lower tenon 25b has bevelled edges to facilitate its engagement into the slot of the adjustment screw 19. The spindle 24 is normally urged against an axial stop in the casing of mechanism 22 by means of a coil compression spring 26 engaging a cam member 27 secured by a cross pin to the spindle 24, as shown, and adapted to engage and actuate a spring-loaded control roller 28 of an elevator-type switch 29. The spindle 24 is adapted to be rotatably driven from a motor 30 via a cogged-belt transmission 31 and this spindle is connected to the hub of one of the cogged wheels 32 of this transmission by means of splines. Thus, during the wear take-up operation the spindle 24 is brought into vertical or axial alignment with the adjustment screw 19 and rotated by the motor 30 whereby the screwdriver tip 25a is resiliently urged against the screw head and "seeks" the slot thereof while compressing the spring 26; thus, cam member 27 releases the spring-loaded roller 28 of switch 29. When the screwdriver tip 25a eventually registers with the screw slot, it engages same while the spindle assembly moves downwards, this movement being assisted by the force of spring 26. During this downward movement of the spindle the means for detecting the engagement of the screw slot by said screwdriver tip 25a become operative, these means consisting primarily of cam member 27 which, through the spring-loaded roller 28 engaging its cam contour, actuates the elevator-type switch 29 to control through delay-action means the electric motor 30 and thus produce a predetermined adjustment of the screw. To perform this adjustment the electric motor 30 is either a step-by-step pulse motor or a conventional electric motor responsive to timing means.

Although a specific form of embodiment and modified details thereof have been described and illustrated herein, it will readily occur to those skilled in the art that various further modifications and changes may be brought thereto without departing from the scope of the invention as set forth in the appended claims.

What is claimed as new is:

1. A bore machining bar comprising an internal channel and at least one externally facing cavity, a tool bit mounted in said cavity so as to be movable radially away from said bar, a passage provided between said cavity and said channel, a tool adjustment device comprising first bearing means movably disposed in said channel to coact with said tool bit through said passage, and second bearing means secured within said channel in a radially opposed and axially offset position relative to said first bearing means, a scaling lever extending longitudinally in said channel and having one of its ends engaging said first and second bearing means, means for adjusting the position of the other end of said scaling lever in a direction transverse to said channel and substantially in a radial plane passing through said first and second bearing means, said adjusting means comprising a control screw penetrating radially into said channel and being held against axial movement in the bar, a nut cooperating with said screw, and intermediate means disposed in said channel cooperating with the other end of said scaling lever and said nut, the rotation of said screw causing displacement of said intermediate means, said displacement of said intermediate means causing the scaling lever to pivot on said second bearing and bear against the first bearing to obtain tool bit adjustment.

2. Tool holder as set forth in claim 1, comprising automatic wear take up means including for each push member a powered spindle carrying an end piece adapted to co-act with said screw, said spindle being carried by a member pivoting about a bar parallel to said bore machining bar, in order to bring said end piece into driving engagement with said screw head when a wear taking-up step is required.

3. Tool holder as set forth in claim 2, wherein the automatic wear take-up device comprises means for detecting the mutual driving engagement between said end piece and the slot of said screw and controlling power means for driving said spindle step by step.

4. Tool holder as set forth in claim 2, wherein the automatic wear take-up device comprises means for detecting the proper driving engagement between said end piece and the head of said screw, said means controlling an electric motor responsive to delay-action means for producing the proper degree of rotation and therefore the required adjustment of said spindle.

5. A bore machining bar according to claim 1, including a spring provided in said channel for exerting a resilient force biasing said bit against radial movement away from said bar, said spring comprising a portion contacting the inner surface of said channel and another portion movable within said channel, and a member passing through the bar for connecting the movable portion of said spring to said tool bit.

6. A bore machining bar according to claim 1, wherein said scaling lever is provided with a pair of opposed blind passages having partially overlapping cross-sectional contours, a wafer of resilient plastic material is disposed within said passages, said first and second bearing means extending into said passages to bear against said wafer, said first bearing means including a bearing ball disposed in said passage to cooperate with said tool bit.

7. A bore machining bar according to claim 1, wherein said intermediate means includes an intermediate scaling lever interposed between said nut and said scaling lever, and a strap pivotally supporting said intermediate scaling lever and secured to the bar within said channel.

8. A bore machining bar comprising an internal channel and a plurality of externally facing cavities, a tool bit mounted in each cavity so as to be movable radially away from said bar, a passage provided between each cavity and said channel, a plurality of tool adjustment devices each comprising first bearing means movably disposed in said channel to coact with one said tool bit through one said passage, and second bearing means secured within said channel in a radially opposed and axially offset position relative to said first bearing means, a scaling lever extending longitudinally in said channel and having one of its ends engaging said first and second bearing means, means for adjusting the position of the other end of said scaling lever in a direction transverse to said channel and substantially in a radial plane passing through said first and second bearing means, said adjusting means comprising a control screw penetrating radially into said channel and being held against axial movement in the bar, a nut cooperating with said screw, and intermediate means disposed in said channel cooperating with the other end of said scaling lever and said nut, the rotation of said screw causing displacement of said intermediate means, said displacement of said intermediate means causing the scaling lever to pivot on said second bearing and bear against the first bearing to obtain tool bit adjustment.

* * * * *